United States Patent
Seo

(10) Patent No.: US 9,019,227 B2
(45) Date of Patent: Apr. 28, 2015

(54) SELECTIVE LOCKING METHOD OF INFORMATION DEVICE HAVING TOUCH SCREEN

(71) Applicant: Rsupport Co., Ltd., Seoul (KR)

(72) Inventor: Hyung Su Seo, Gyeonggi-Do (KR)

(73) Assignee: RSupport Co., Ltd., Seoul (KR)

( * ) Notice: Subject to any disclaimer, the term of this patent is extended or adjusted under 35 U.S.C. 154(b) by 65 days.

(21) Appl. No.: 14/062,382

(22) Filed: Oct. 24, 2013

(65) Prior Publication Data

US 2014/0111453 A1    Apr. 24, 2014

(30) Foreign Application Priority Data

Oct. 24, 2012 (KR) .................. 10-2012-0118227

(51) Int. Cl.
*G06F 3/041* (2006.01)
*G06F 3/0488* (2013.01)

(52) U.S. Cl.
CPC .... *G06F 3/04883* (2013.01); *G06F 2203/0381* (2013.01)

(58) Field of Classification Search
CPC ..... G06F 3/041; G06F 3/0416; G06F 3/0481; G06F 3/0484; G06F 3/04883
See application file for complete search history.

(56) References Cited

U.S. PATENT DOCUMENTS

| 7,657,849 | B2 * | 2/2010 | Chaudhri et al. | 715/863 |
| 8,843,222 | B2 * | 9/2014 | Nelson | 700/94 |
| 2003/0048180 | A1 * | 3/2003 | Takee et al. | 340/457 |
| 2004/0172396 | A1 * | 9/2004 | Vanska et al. | 707/9 |
| 2004/0177072 | A1 * | 9/2004 | Salminen et al. | 707/9 |
| 2004/0268267 | A1 * | 12/2004 | Moravcsik | 715/821 |
| 2005/0079896 | A1 * | 4/2005 | Kokko et al. | 455/566 |
| 2005/0253817 | A1 * | 11/2005 | Rytivaara et al. | 345/173 |
| 2007/0177740 | A1 * | 8/2007 | Nakajima | 380/277 |

FOREIGN PATENT DOCUMENTS

| KR | 10-2010-0053144 A | 5/2010 |
| KR | 10-2011-0047409 A | 5/2011 |

* cited by examiner

*Primary Examiner* — Joe H Cheng
(74) *Attorney, Agent, or Firm* — Mintz Levin Cohn Ferris Glovsky and Popeo, P.C.; Kongsik Kim

(57) ABSTRACT

An input apparatus of an information device is selectively locked by physically installing a selective lock key in the information device, executing an application program installed therein, and blocking, if the selective lock key is handled after the application program is executed, input through a system key of the information device while accepting input through an application button. With this method, for example, an unintended touch on a system key while using an information device can be prevented.

3 Claims, 8 Drawing Sheets

RELATED ART

RELATED ART

SELECTIVE LOCKING METHOD OF INFORMATION DEVICE HAVING TOUCH SCREEN

CROSS-REFERENCE TO RELATED APPLICATION

The present application claims priority to Korean Application No. 10-2012-0118227, filed on Oct. 24, 2012, which is incorporated herein by reference.

TECHNICAL FIELD

The present disclosure relates to a method of locking an input means of an information device such as a smart phone or the like applying a touch screen as an input-output means, in which if handling of a selective lock key physically installed in the information device is sensed or touch on a selective lock object implemented on the touch screen is sensed, input through a system key of the information device, such as a home key, a menu key, a back key or the like, is blocked.

RELATED ART

In an information device such as a smart phone, a tablet PC or the like applying a touch screen 10 as an input-output means, as shown in FIG. 1, an input apparatus may be classified as a touch screen 10, which is a basic input means, or a physical key installed in the information device other than the touch screen 10.

In an information device having a touch screen 10 such as a smart phone, a table PC or the like which is widely distributed in recent days, the physical key is may generally be referred to as a hard key, and the physical key may be a power/lock key 21, a home key 22, a menu key 23, a back key 24, a volume key 25 or the like as shown in the upper part of FIG. 1.

In addition, in contrast to the hard key, a name referred to as a soft key is also used. Here, the soft key is a key which senses touch of a user without physical deformation, and touch sensing type input means contained in the bezel of an information device screen, such as a menu key 23 and a back key 24 shown in the upper part of FIG. 1, correspond to the soft key.

Accordingly, in the information device having a touch screen 10 as shown in FIG. 1, although the menu key 23 and the back key 24 can be classified as a physical key, if an input means configured as other than the touch screen 10, i.e., the main input-output means, it may be classified as a physical key, and the menu key 23 and the back key 24 are classified as a soft key from the viewpoint of an operation method, and thus the physical key and the soft key cannot be regarded as a correct classification.

In addition, in some information devices using a touch screen 10, since there are some cases where the menu key 23, the back key 24 and the like described above are not physically installed, but touch objects performing the functions of the physical keys are implemented at specific positions on the touch screen 10 in order to minimize the configuration of the physical keys, there are also some cases where physical installation of a corresponding input means, other than the touch screen 10 as an input means, does not specify a function of the input means, and various sensors which are ambiguous to be classified as a hard key or a soft key, such as a light sensor, an acceleration sensor, a touch sensor and the like, are installed as input keys.

Accordingly, in the information device having a touch screen 10, it is reasonable to classify an input means which handles basic functions of the hardware and operating system of the information device as a system key regardless of its position and operation method, like the power/lock key 21 for cutting power or blocking input, the home key 22 for initializing the touch screen 10 or turning on the light of the screen, the menu key 23 for executing a connection menu that can be used on a corresponding screen, the back key 24 for canceling the current screen and returning to a previous screen and the volume key 25 for adjusting volume of various functions or setting vibration. Further, it is reasonable to classify objects other than the system keys, such as an icon, a button image or the like, which is implemented on the touch screen 10 as an application program that is executed and that controls operation of the corresponding application, as application buttons 11.

In a conventional information device, having a touch screen 10, an input means locking function is performed by the power/lock key 21. If the power/lock key 21 is pressed in a blackout state of the touch screen 10, the backlight of the touch screen 10 is turned on, and an unlock screen is output. If the power/lock key 21 is pressed in the initial screen state of the touch screen 10, the touch screen 10 is switched to the blackout state, and input through the touch screen 10 is blocked, so that while an application program is executed, input through the home key 22, the back key 24, the menu key 23 or the touch screen 10 is blocked.

Techniques related to the input means locking function of the information device having a touch screen 10 are developed mainly focusing on a method of promptly releasing a locking state rather than the locking function itself. A typical example thereof is U.S. Pat. No. 7,657,849, which is generally referred to as "slide to unlock."

The unlocking function is emphasized more than the locking function in locking and unlocking an input means of an information device having a touch screen 10, in order to maintain a locking state at all times, even while the power is on, and to promptly release the locking state immediately before a user uses the corresponding information device, since an input error is highly probable to occur through an unconscious touch in a standby state by the nature of the touch screen 10, and power can be excessively consumed, thus reducing the lifespan of the touch screen 10 if the touch screen 10 operates at all times.

Accordingly, although a variety of methods for promptly and safely unlocking an information device having a touch screen 10 has been developed, only a simple and collective function is provided for the locking itself through the power/lock key 21.

FIGS. 1 and 2 are views showing mishandling situations of a conventional information device having a touch screen 10, as an example. FIG. 1 shows, for example, a situation in which a camera function is forcibly terminated as a user accidentally touches a back key 24, which is a system key, in the process of handling a shutter button, which is an application button 11 implemented on an execution screen of a corresponding application program, in using a camera function installed in a smart phone. FIG. 2 shows, for example, a situation in which a screen is switched to an initial screen as a user accidentally touches a home key 22, which is a system key, in the process of handling a volume slider, which is an application button 11, in using a video player installed in a smart phone.

Like this, if an application program is terminated or a screen is switched due to an unintended touch to a system key by a user while the application program installed in the information device having a touch screen 10 is executed, a serious inconvenience of the user is induced.

Although a corresponding information device can be switched to a locking state by handling the power/lock key 21 as a measure for preventing such mishandling, in this case, since input through the touch screen 10 itself, as well as a system key, is blocked all together, the application button 11, i.e., a shutter button, in the case of the camera function application of FIG. 1, a pause button, a volume slider or the like in the case of the video player of FIG. 2, cannot be handled. Thus, a serious problem of disallowing normal use of the corresponding application program may be generated.

SUMMARY

The present embodiments have been made in view of the above problems. According to the present embodiments, in a method of locking an input apparatus of an information device applying a touch screen 10 as an input-output means, a selective locking method of the information device having a touch screen includes the steps of: physically installing a selective lock key 31 in the information device having a touch screen 10, and executing an application program installed in the information device having a touch screen 10; and when the selective lock key 31 is handled, blocking input through a system key of the information device having a touch screen 10 and accepting input through an application button 11. Then, when the selective lock key 31 is handled again, the step of releasing the input blocking through the system key of the information device having a touch screen 10 is performed.

In addition, in a method of locking an input apparatus of an information device applying a touch screen 10 as an input-output means, a selective locking method of the information device having a touch screen includes the steps of: executing an application program installed in the information device having a touch screen 10; outputting a selective lock object 32, which is a kind of application button 11, on a corresponding application program screen; and when touch on the selective lock object 32 is sensed, blocking input through a system key of the information device having a touch screen 10 and accepting input through an application button 11. Then, when the selective lock key 31 is handled again, the step of releasing the input blocking through the system key of the information device having a touch screen 10 is performed.

In addition, in a method of locking an input apparatus of an information device applying a touch screen 10 as an input-output means, a selective locking method of the information device having a touch screen includes the steps of: executing an application program installed in the information device having a touch screen 10; when a previously set system key is handled among system keys of the information device having a touch screen 10, outputting a selective lock object 32, which is a kind of application button 11, on a corresponding application program screen; and when touch on the selective lock object 32 is sensed, blocking input through a system key of the information device having a touch screen 10 and accepting input through an application button 11.

DESCRIPTION OF SYMBOLS

| | |
|---|---|
| 10: Touch screen | 11: Application button |
| 21: Power/lock key | 22: Home key |
| 23: Menu key | 24: Back key |
| 25: Volume key | 31: Selective lock key |
| 32: Selective lock object | |

DETAILED DESCRIPTION

The detailed configuration and execution process of the present disclosure will be hereafter described with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that the below methods may be executed by at least one control unit. The term "control unit" refers to a hardware device that includes a memory and a processor. The memory is configured to store program instructions and the processor is specifically configured to execute said program instructions to perform one or more processes which are described further below.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
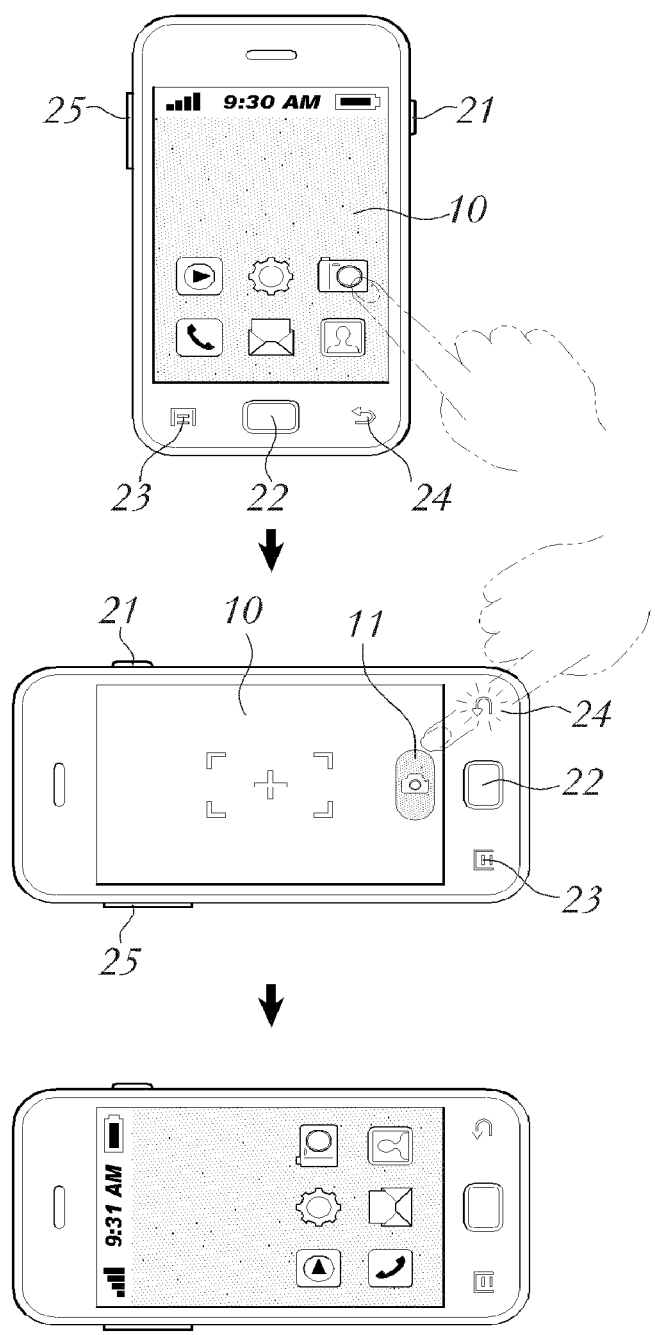
FIGS. 1 and 2 are views showing examples of a mishandling state in a conventional information device having a touch screen.
Figure 2:
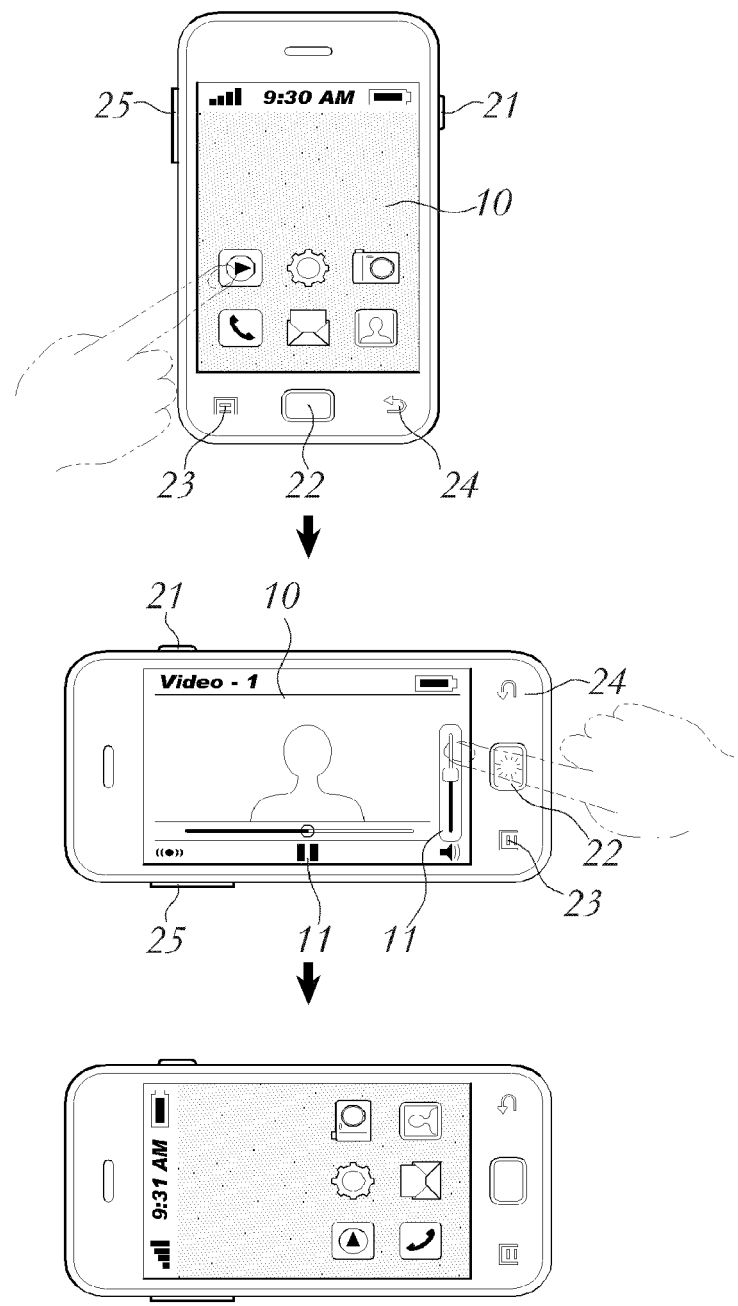
Figure 3:
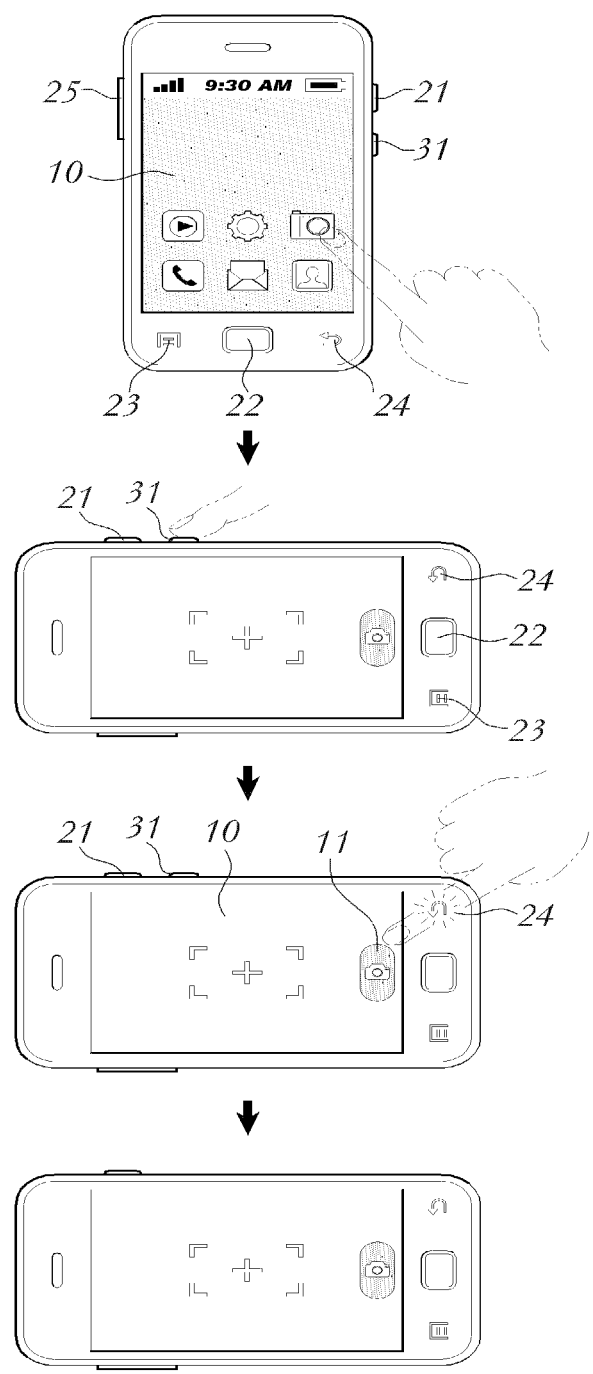
FIG. 3 is a view showing an example of performing an embodiment of the present disclosure, in which a selective lock key is applied.

FIG. 3 is a view showing an embodiment of the present disclosure, in which a selective lock key 31 is physically installed in the hardware of the information device having a touch screen 10, and a situation of executing an application program which performs a camera function is presented in the embodiment shown in the figure.

As shown in FIG. 3, in the information device having a touch screen 10 and performing the present invention, i.e., an information device such as a smart phone, a tablet PC or the like having the touch screen 10 as an input-output means, a selective lock key 31 is physically installed in the hardware of the corresponding information device. Although the selective lock key 31 is configured as a hard key having a structure the same as that of a general power/lock key 21 in the embodiment shown in FIG. 3, it may be configured in the form of a soft key, such as a menu key 23 or a back key 24, or an input key of a sensor type.

Figure 5:
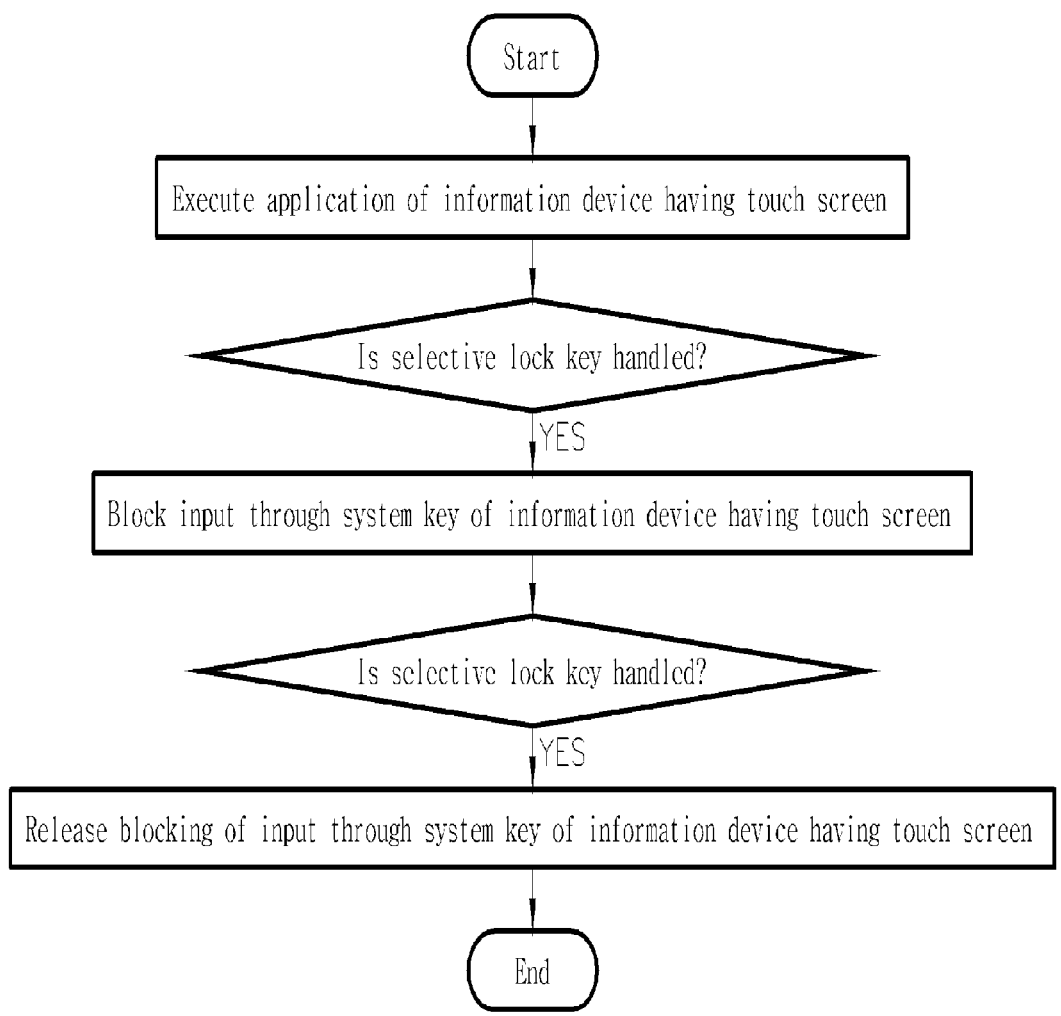
FIG. 5 is a flowchart illustrating the embodiment of FIG. 3.

As shown in FIGS. 3 and 5, the embodiment applying the physical selective lock key 31 of the present invention starts to operate by executing an application program installed in the corresponding information device having a touch screen 10, as a user touches a specific application icon on the touch screen 10. When the user performs handling of the information device, such as pressing the selective lock key 31, after the application program of the information device having a touch screen 10 is executed, although input through a system key of the corresponding information device having a touch screen 10 is blocked, input through an application button 11 is accepted. That is, if the selective lock key 31 is handled, any input is not allowed. Although a system key, such as the back key 24, the home key 22, the menu key 23 or the like, is handled, and input is accepted only through an application button 11, which is an object such as an icon, a button image or the like, implemented on the touch screen 10 as an application program.

As shown in FIG. 3, since an application program is not terminated or a screen is not switched, although a user accidentally touches a system key, such as the back key 24 or the like, in the process of handling the application program executed by touching the touch screen 10, while input through the system key of the information device having a touch screen 10 is blocked by handling the selective lock key 31, the application program is thus convenient to use. Although the size of an information device itself is reduced in order to maximize portability by the nature of an information device having a touch screen 10, which is a portable device in most cases, the size of the touch screen 10 tends to be extended to the maximum in order to secure readability of the screen and convenience of input handling. Therefore, since the bezel of the touch screen 10 has to be reduced and system keys, such as the home key 22, the back key 24, the menu key 23 and the like, should be densely disposed in the narrow bezel, an unintended touch to a system key is generated in the process of handling the touch screen 10 or holding the corresponding information device by the user. Thus, the user suffers from inconvenience of mishandling, and the inconvenience may be relieved through the present disclosure.

Particularly, in the case of an application program of a camera function, for example, as shown in FIG. 3, when a user asks a person unaccustomed to the usage of the corresponding information device to take a picture, the possibility of the mishandling described above is further increased. In this case, the disclosed embodiments can be conveniently used in a method of asking the person to take a picture after handling the selective lock key 31 to block input through a system key.

In a selective locking state of a system key locked by handling the selective lock key 31, as described above, locking of the system key may be released by handling again the selective lock key 31, as shown in FIG. 5. The disclosed embodiments may be provided as a basic function included in the operating system of the information device having a touch screen 10, or provided by installing an application program implementing the disclosed embodiments in the information device having a touch screen 10 and executing the corresponding application program.

Figure 4:
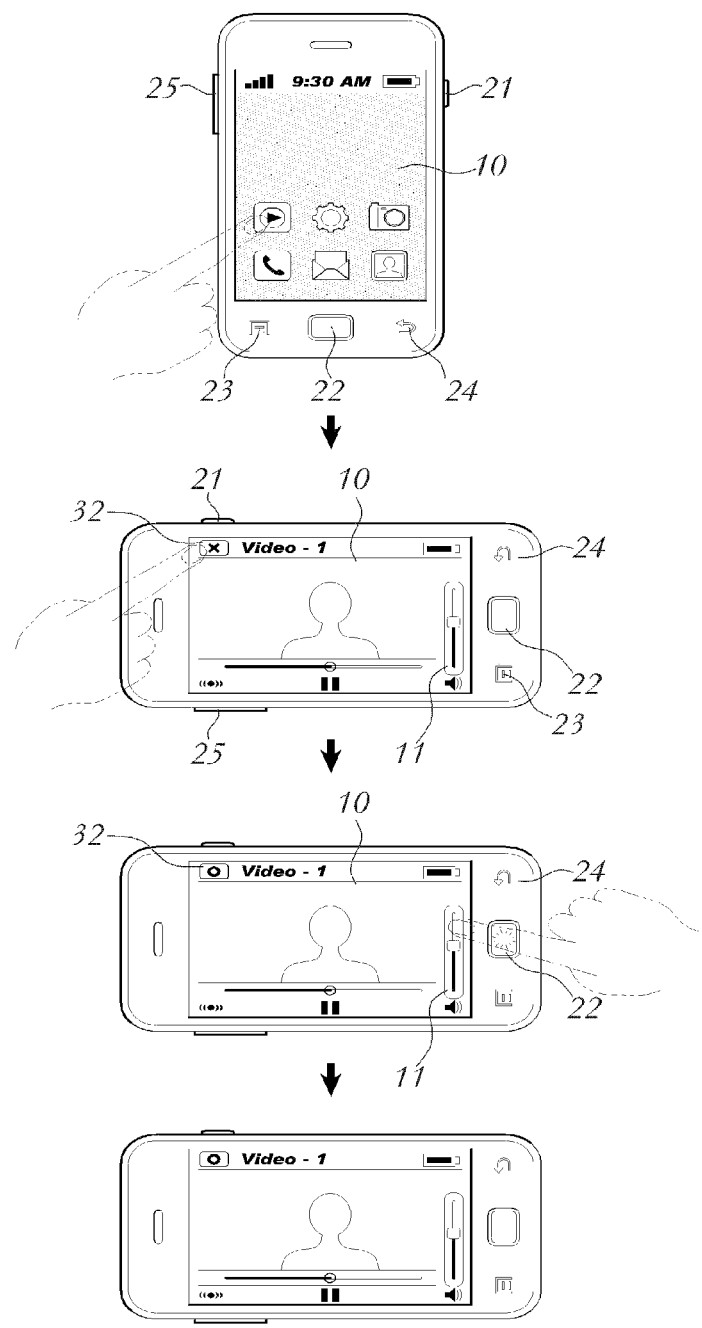
FIG. 4 is a view showing an example of performing an embodiment of the present disclosure, in which a selective lock object is applied.
Figure 6:
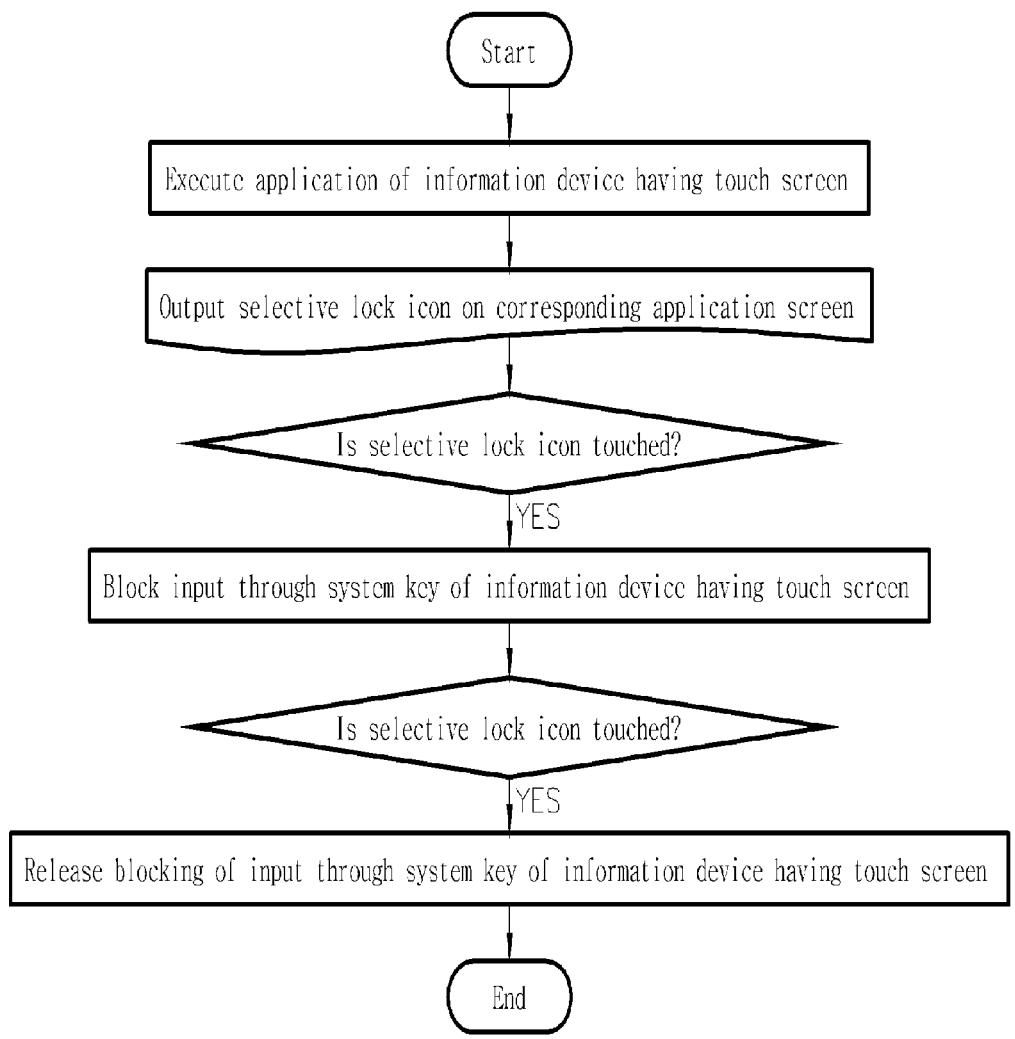
FIG. 6 is a flowchart illustrating the embodiment of FIG. 4.

On the other hand, in FIGS. 4 and 6, the selective lock key 31 physically installed in the hardware of the information device having a touch screen 10 is not used in exercising the selective locking on a system key. Instead, it is used as an object, such as an icon, a button image or the like, implemented on the touch screen 10, i.e., a selective lock object 32, which is a kind of application button 11, as described below. As shown in FIG. 4 in which a situation of executing a video player installed in a smart phone is presented, an application program installed in the information device having a touch screen 10 is executed as a user touches a specific application icon on the touch screen 10, and a selective lock object 32 is output on the application program screen. Then, when touch to the selective lock object 32 is sensed, input through a system key of the information device having a touch screen 10 is blocked, and input through the application button 11 is accepted. Accordingly, as shown in FIG. 4, in using the video player installed in a smart phone, for example, since the application program is not terminated or the screen is not switched, although the user accidentally touches a system key, such as the home key 22 or the like, in the process of handling a volume slider, which is an application button 11, the application program is convenient to use.

In a selective locking state of a system key locked by touching the selective lock object 32 on the touch screen 10, locking of the system key can be released by touching again the selective lock object 32, as shown in FIG. 6. If a user is allowed to visually confirm the selective locking state of a system key by changing the image type of the selective lock object 32 after the selective lock object 32 is touched as shown in FIG. 4, the application program is further convenient to use.

Figure 7:
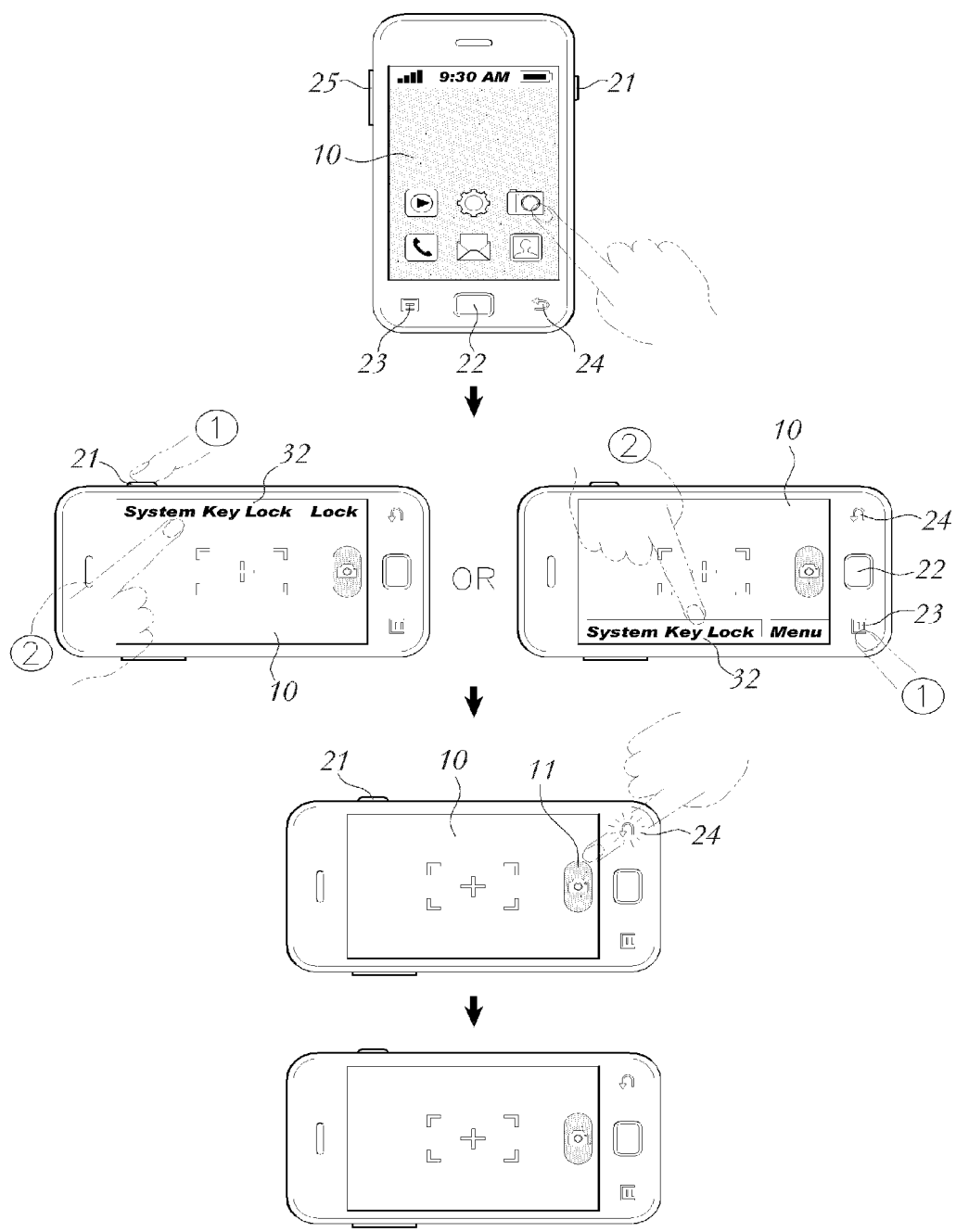
FIG. 7 is a view showing an example of performing an embodiment of the present disclosure, in which a system key and a selective lock object are utilized.
Figure 8:
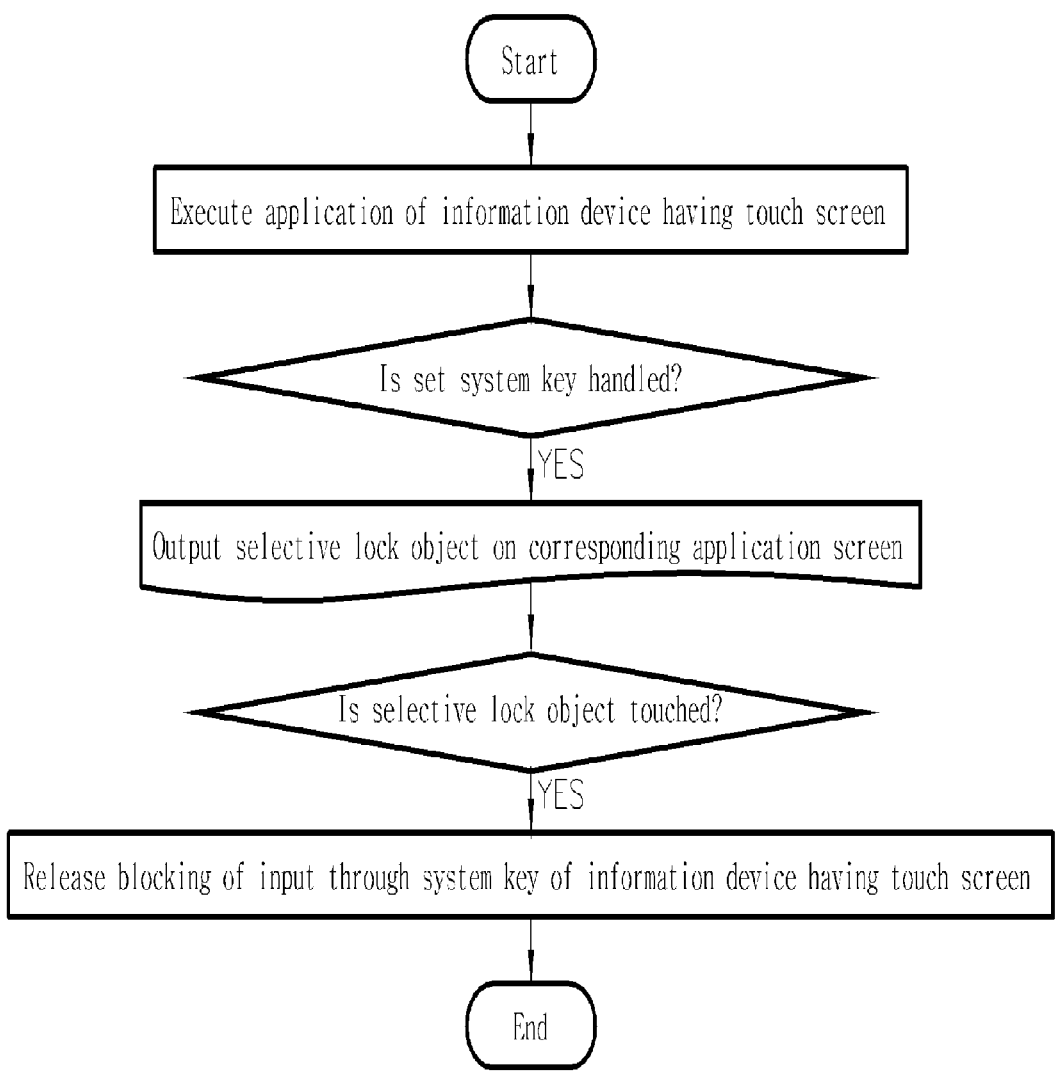
FIG. 8 is a flowchart illustrating the embodiment of FIG. 7.

Meanwhile, FIGS. 7 and 8 are views showing an embodiment of performing a selective locking function by combining an existing system key of the information device having a touch screen 10 and the selective lock object 32, as described above. As shown in FIG. 7, in which a situation of executing a camera application program installed in a smart phone, for example, is presented, the application program installed in the information device having a touch screen 10 is executed as a user touches a specific application icon on the touch screen 10. When the user handles a previously set system key among the system keys of the information device, a selective lock object 32 is output on the corresponding application program screen.

In order to perform the disclosed embodiment shown in FIG. 7, it is previously set to perform a selective locking function other than the original function, when at least one of the system keys of the information device having a touch screen 10 is handled, and the previously set system key may be set in the manufacturing process by the manufacturing company of the information device, or the operating system or may be set by a user through a basic environment setting function of the information device.

FIG. 7 shows an example of applying a power/lock key 21 or a menu key 23 as a previously set system key, and as shown in the figure, if a user handles the previously set system key, a menu type selective lock object 32 is implemented on the touch screen 10. Then, when touch on the menu type selective lock object 32 is sensed, input through the system key of the information device having a touch screen 10 is blocked, while input through the application button 11 is accepted. Thus, although the system key is accidentally touched while using the corresponding information device, the application is not terminated, and the screen is not switched.

If a corresponding previously set system key is handled again, the selective lock object 32 is output again on the touch screen 10, and the selective locking state of the system key locked by handling the previously set system key and touching the selective lock object 32 can be released by touching the selective lock object 32 output again. Alternatively or additionally, the locking state may be released by outputting the selective lock object 32 for releasing the locking state on the touch screen 10 at all times under the selective locking state.

In addition to the methods set forth above, the present disclosure may be embodied, for example, as an apparatus including an information device having a touch screen 10 as an input-output means and having a power/lock key 21 configured to perform a method of locking an input means. A selective lock key 31 may be physically installed in the information device having a touch screen 10, and an application program may be installed in the information device having a touch screen 10 and executed. Moreover, in accordance with the present disclosure, when the selective lock key 31 is handled after the application program is executed, input through a system key of the information device having a touch screen 10 may be blocked, while input through an application button 11 may be accepted.

Since mishandling caused by an unintended touch on a system key while using the information device having a touch screen 10 can be prevented through the present disclosure, convenience of a user and utilization of the information device having a touch screen 10 can be improved. Moreover, since mishandling caused by an unintended touch on a system key while using an information device having a touch screen 10 can be fundamentally prevented through the present disclosure, convenience of a user can be improved, and utilization of the information device having a touch screen 10 can be enhanced.

While the disclosed embodiments have been described with reference to the particular illustrative embodiments, the present disclosure is not to be restricted by those embodiments, but only by the appended claims. It is to be appreciated that those skilled in the art can change or modify the embodiments without departing from the scope and spirit of the present disclosure.

What is claimed is:

1. A method of selectively locking an input apparatus of an information device having a touch screen as an input-output means and having a power/lock key configured to perform a method of locking an input means, the method comprising the steps of:
    physically installing a selective lock key in the information device having a touch screen, and executing an application program installed in the information device having a touch screen; and
    when the selective lock key is handled after the application program is executed, blocking input through a system key of the information device having a touch screen and accepting input through an application button.

2. A method of selectively locking an input apparatus of an information device having a touch screen as an input-output means and having a power/lock key configured to perform a method of locking an input means, the method comprising the steps of:
    executing an application program installed in the information device having a touch screen;
    outputting a selective lock object, which is a kind of application button, on a corresponding application program screen; and
    when touch on the selective lock object is sensed, blocking input through a system key of the information device having a touch screen and accepting input through the application button.

3. An information device comprising:
a touch screen as an input-output means;
a power/lock key configured to perform a method of locking an input means;
a selective lock key installed therein; and
an application program installed therein,
wherein when the selective lock key is handled after the application program is executed, input through a system key of the information device is blocked, and input through an application button in accepted.

\* \* \* \* \*